United States Patent [19]
Hatch

[11] 3,813,510
[45] May 28, 1974

[54] ELECTRIC ARC TORCHES

[75] Inventor: Bruce O. Hatch, Lebanon, N.H.

[73] Assignee: Thermal Dynamics Corporation, W. Lebanon, N.H.

[22] Filed: Oct. 30, 1972

[21] Appl. No.: 302,123

Related U.S. Application Data

[63] Continuation-in-part of Ser. No. 223,717, Feb. 4, 1972.

[52] U.S. Cl. .............................................. 219/121 P
[51] Int. Cl. ............................................. B23k 9/00
[58] Field of Search ............... 219/121 P, 76, 75, 74

[56] References Cited
UNITED STATES PATENTS

| | | | |
|---|---|---|---|
| 3,027,446 | 3/1962 | Browning | 219/75 |
| 3,222,568 | 12/1965 | Richards | 219/121 P X |
| 3,223,822 | 12/1965 | Browning et al. | 219/121 P |
| 3,294,953 | 12/1966 | Spies, Jr. | 219/121 P |
| 3,562,486 | 2/1971 | Hatch et al. | 219/74 X |
| 3,628,079 | 12/1971 | Dobbs et al. | 219/121 P |
| 3,641,308 | 2/1972 | Couch, Jr. et al. | 219/121 P |

*Primary Examiner*—J. V. Truhe
*Attorney, Agent, or Firm*—Whitcomb, Clark & Moeser

[57] ABSTRACT

This is an improvement to electric arc torch of the type producing plasma flames for cutting, welding, and other high temperature applications. The nozzle assembly of the torch provides close control of gas supplied to the electrode in a strong vortex to stabilize and enhance the directivity of the arc column.

5 Claims, 7 Drawing Figures

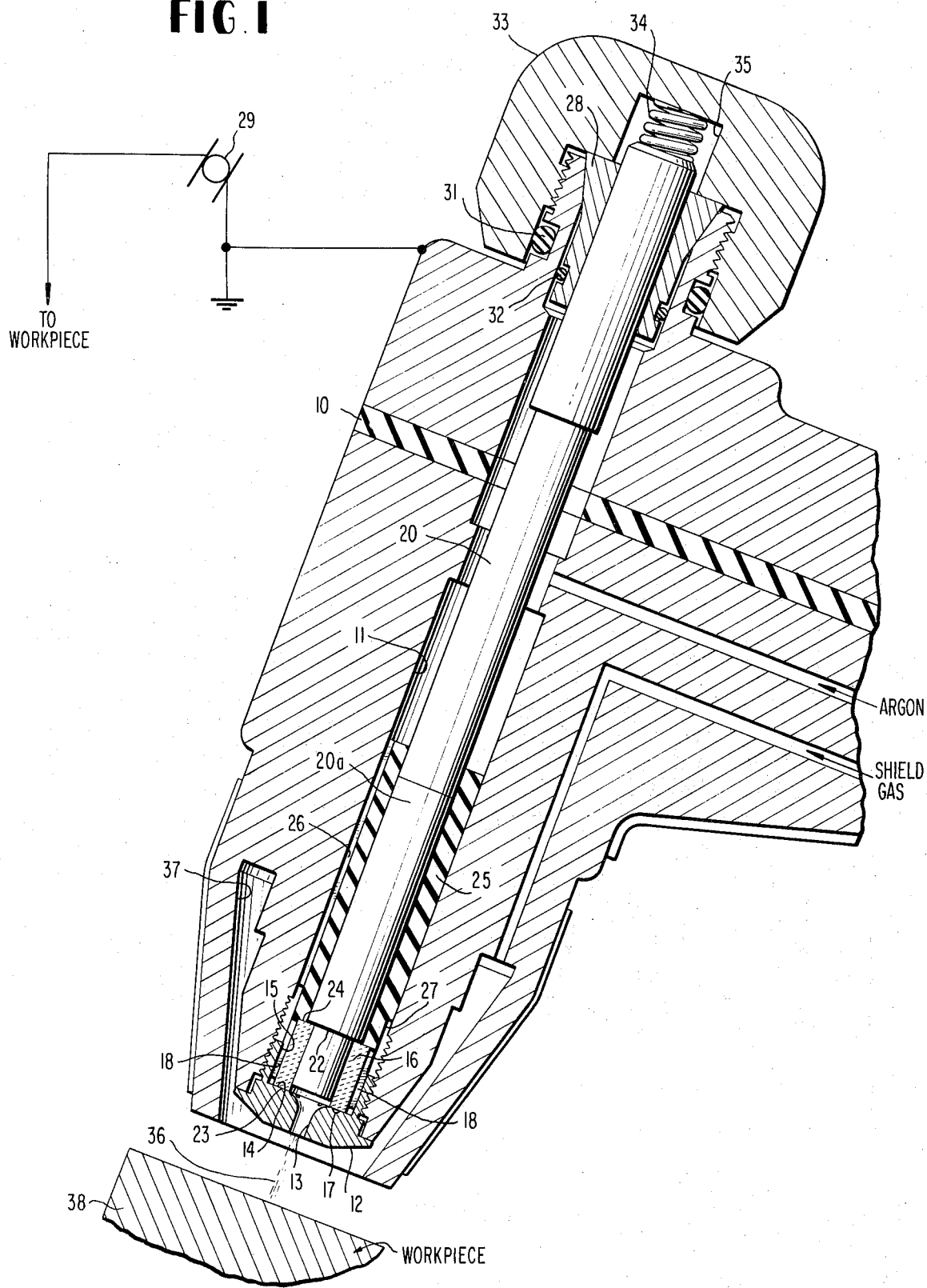

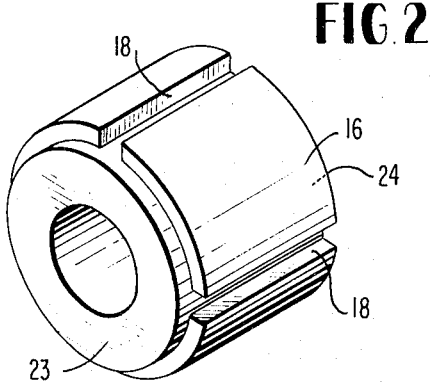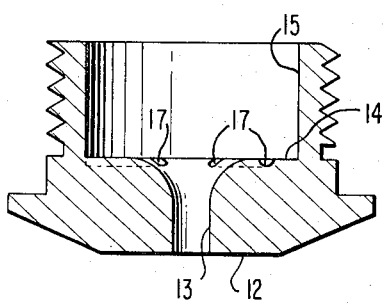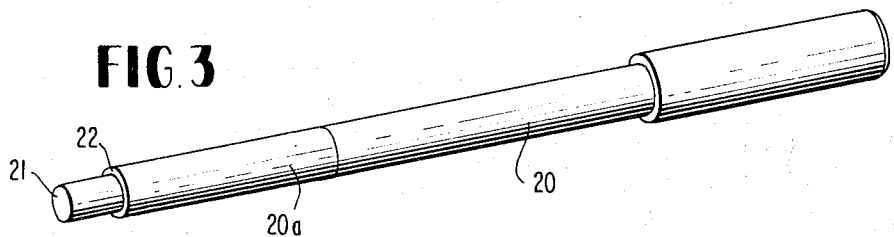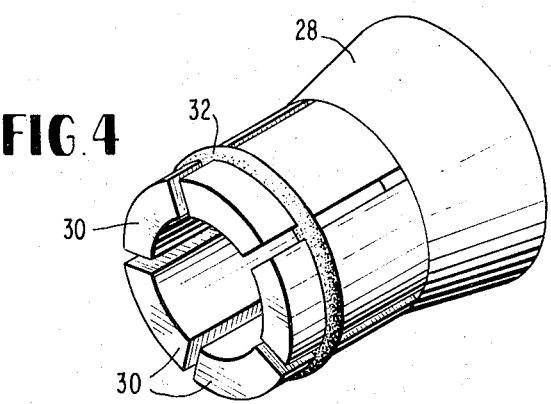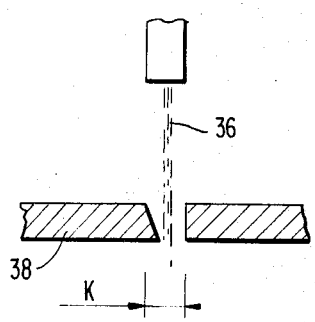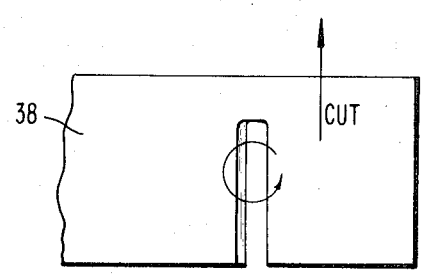

ELECTRIC ARC TORCHES

This application is a continuation-in-part of U.S. Ser. No. 223,717, filed Feb. 4, 1972, by Bruce O. Hatch, the present inventor.

My invention relates to electric torches and relates more particularly to improved means for introducing a plasma forming (and arc stabilizing) gas into such torches. The torch herein to be described affords a new and practical embodiment of the ideas first presented in U.S. Pat. No. 3,027,446, issued Mar. 27, 1962 to James A. Browning.

In said patent the advantages of a gas vortex stabilized arc are discussed. A vortex developed in the plane of the arc emitting electrode sweeps around the electrode axis and keeps the arc centrally positioned. A portion of the gas closest to the center becomes ionized, enters and supports the arc column, and becomes a plasma, thus taking part in the heat transfer process. For use in cutting and welding, such arc torches are generally operated in the transferred mode--that is, the workpiece is connected as an anode, and the arc column runs from the torch electrode to the work.

In the course of developing commercial models of these torches it has been found that successful operation is critically dependent on the exact manner in which the plasma-forming arc stabilizing gas (or mixture of gases) is presented in relationship to the electrode, to the torch nozzle, and to the theoretical position of the arc column desired. In precision cutting or precision positioning of welds on work this is particularly the case. I have found that symmetry of effect around the arc column is important in contour cutting or welding. This requires, therefore, good control of the flow of gases to and around the arc column, and particularly at the point of arc origin on the torch electrode surface.

I have further found that if the gases are placed exactly as required, much less gas flow is required. In prior art torches a significant portion of the gas was wasted, in that it did not directly enter into the functions for which it was intended. Thus the advantages of the device of the present invention are: (a) arc control becomes precise for improved cutting and welding, and (b) higher speeds with less expenditure of both electrical energy and expensive gases (such as argon) are attainable.

I have developed, therefore, torch components in which substantially all of the gas used is directed to form a strong vortex at the electrode surface; also dimensional changes due to heat produced during operation are accomodated without reducing the efficiency of the unit.

For a complete understanding of this invention, I refer now to the accompanying drawings in which FIG. 1 is a view, in section of a torch constructed in accordance with the invention;

FIGS. 2, 2a, 3, and 4 are detailed views, in perspective, of ceratin key components of the torch of FIG. 1;

FIGS. 5a and 5b are illustrations of a cut produced by the torch in a metallic workpiece.

Referring now more particularly to FIG. 1, I show a torch body in two main parts, separated electrically from each other by an insulating wafer 10. A central bore 11 runs the length of the body as shown. At the working end of the torch a nozzle 12 is threaded into the bore 11 and closes the end thereof but for a nozzle passageway 13. The nozzle 12 may be made of copper and has flat inner face 14 formed at the bottom of a counter bore 15. In said face 14 are formed a number of slots 17 tangential to passageway 13 and communicating therewith. This is best shown in FIG. 2a. Nested in the counter bore 15, and tightly abutting the face 14 is a gas distributor 16. This distributor is best shown in the detail of FIG. 2. The front planar surface 23 of distributor 16 nests against the inner face 14 of nozzle 12. The reduced diameter end of distributor 16 forms a manifold communicating with tangential slots 17 in the nozzle face 14. The manifold, in turn, is connected by channels 18 with the rear face of the distributor 16. The distributor 16 may be made of ceramic or any insulating material such as boron nitride, as disclosed in U.S. Pat. No. 3,562,486, issued Feb. 5, 1971, where the advantages of such materials are explained. I have also found that beryllium oxide (Beryllia) is an excellent material as it is a good conductor of heat and yet is an effective electrical insulator.

The distributor 16 serves to center and support an electrode 20 which runs the length of bore 11. The nozzle end of electrode 20 may be made of tungsten as shown at 20a while the remaining length to the rear of the torch may be of copper or other relatively inexpensive material. I show the electrode 20 in detail in FIG. 3. The tungsten, or working, end 20a has reduced diameter at the end as shown. The distance between the electrode face 21 and the shoulder 22 is slightly less than the distance from the front surface 23 to the back surface 24 of the distributor 16. Thus it will be seen that when the distributor 16 is assembled on the electrode and nested in nozzle 12 (FIG. 1) the tangential slots 17 in the inner face of nozzle 12 open directly on the front electrode face 21 and run parallel thereto. Along the bore 11 an insulating sleeve 25 of beryllium oxide or similar material surrounds the electrode 20. This sleeve 25 has a series of longitudinal grooves 26 on its outer surface and a circumferential groove 27 at the nozzle end thereof. The sleeve 25 is free to slide on the electrode body 20 and serves to provide a conducting path for heat from the electrode into the heat sink of the torch body itself. That body may be water cooled with appropriate water passages, which have been omitted for the sake of clarity.

The end of the electrode remote from the nozzle of the torch is centered and supported by a wedge member 28 which nests in a corresponding tapered surface in the bore 11. The member 28 is shown in detail in FIG. 4. Electrical energy is delivered to the electrode 20 through a portion of the torch body and member 28. Slots as shown from collet fingers 30 which are biased slightly toward the center of the bore to produce a slidable grip on the electrode surface. Sealing rings 31 and 32 complete the end seal of the bore 11, in conjunction with end nut 33 which, when tightened, secures the entire assembly and presses the tapered portion of the member 28 into its mating bore surface.

It will be noted that the electrode 20 is free to move axially, subject only to the slight restraint of collet fingers 30. However, a spring 34 between the electrode end and the bottom of a cavity 35 in the end nut 33 keeps the electrode mechanically biased toward the torch nozzle. Spring 34 is chosen such that when the nut 33 is tightly secured, it is in partial compression; thus an axial degree of freedom is afforded to electrode 20, with the spring pressure keeping the surface 23 firmly against inner face 14 in the nozzle 12.

In operation, gas (which may be argon) is introduced under pressure into the bore 11 between the bore wall and the electrode 20. The gas travels through grooves 26, channels 18, and slots 17 to produce a strong vortex at the electrode face 21. The size of all slots, channels, and grooves are chosen such that substantially all the gas pressure drop in the system occurs across the tangential slots.

With the pressure from spring 34 creating an effective seal between distributor 16 and nozzle 12, all of the gas is forced to flow through the tangential slots 17. An arc 36 is struck from said face 21 to a work piece, which is connected in the electrical circuit as an anode. The arc column is thus carefully centered, closely constricted, and can be directed on the work precisely where desired.

During prolonged operation, the electrode 20 elongates an appreciable amount due to thermal expansion. I am able to keep all of the components in effective working relationship in spite of such dimensional changes by permitting the electrode to expand (and contract) against the spring 34. The gas seal between the distributor 16 and the nozzle 12 is thus preserved over wide range of operating temperatures. This is essential if the gas-directing channels and particularly the tangential slots 17 are to remain completely effective as described above in keeping the gas flowing exactly as desired.

I have found that if some gas escapes into nozzle passageway 13 other than as directed tangentially, the resulting asymmetry causes the arc column to stray sporadically from the geometric axis of the nozzle. Poor cuts, inaccurate welds and possible torch failure can be the consequences of such unpredictable action. In contour cutting and welding it is highly desirable to have the arc column act on the work in an identical manner whatever the direction of movement of torch along the work surface. The torch herein described presents an arc column with the desired symmetry to the work, and keeps the column precisely concentrated. It does so with a minimum consumption of gas and over the entire range of practical working temperatures.

In cases where a secondary gas flow is desired, as for shielding or otherwise, my torch can be provided with an envelope 37 through which gas may be supplied in an annular flow around the arc column to the work surface.

On the question of symmetry (and to illustrate its importance) I noted a significant difference in the two sides of the kerf of a cut as a function of the sense of rotation of the vortex of the arc stabilizing gas. Referring to FIG. 5a I show a workpiece 38 severed with kerf, k, as shown. The kerf is narrow as desired. In the cut as shown the torch is moving away from the observer—that is, into the paper. Looking down on the workpiece, FIG. 5b the circular arrow shows a counter-clockwise gas vortex rotation. The cut is proceeding in the direction of the straight arrow. In this case the right side of the kerf is straight, as viewed in FIG. 5a and the left side is tapered. Were the travel of the torch to be reversed (or the vortex rotation reversed) the kerf characteristics would change sides.

By reason of this phenomenon, the theoretical basis for which is not yet understood, I choose the parameters of torch direction where possible to produce the straight kerf side on the desired side. If extraneous gas other than that of the vortex gets involved in the process, the quality of the kerf deteriorates on both sides. For this reason, my electrode assembly as described above produces predictable results.

By way of emphasising the practical attributes of my invention the following tabulated information will be useful to those skilled in this art:

| | |
|---|---|
| Nozzle orifice (13) | 0.055" diameter |
| Nozzle length* | 0.023" |
| Tangential Slots (V-shaped in copper) | 0.030" wide at the top |
| | 0.010" deep |
| | 0.140" long |
| Stabilizing gas, composition | 80% Argon |
| | 20% Hydrogen |
| Stabilizing gas, amount | 70 scfh |

*distance from inner face 14 to front face of nozzle 12

EXAMPLE I

| | |
|---|---|
| Type 304 Stainless Steel | 0.250" thick |
| Current: 50 Amperes | |
| Voltage 110 | |
| Kerf Width (av) | 0.125" |
| Cutting Speed | 10" min. |

EXAMPLE II

| | |
|---|---|
| Type 304 Stainless Steel | 0.500" thick |
| Current 100 amperes | |
| Voltage 110 | |
| Kerf Width (av) | 0.125" |
| Cutting Speed | 24" per min. |

EXAMPLE III

| | |
|---|---|
| Type 304 Stainless Steel | 1.500" thick |
| Current 175 amperes | |
| Voltage 115 | |
| Kerf Width | 0.156" |
| Cutting Speed | 12" per min. |

The narrow kerfs reliably achieved in all the above examples have the characteristics explained above. The beneficial results are due to the precise arc column control obtained with my improved torch assembly. While a particular embodiment of my invention has been shown by way of illustration, variations within the spirit and scope of these teachings will occur to others skilled in this art.

I claim:

1. An electrode-nozzle assembly for an electric arc torch comprising; an elongated electrode centered in the body of said torch and having an end plane forming an electric arc terminus; a gas distributor mounted on the end of said electrode and having a flat front surface and gas conducting grooves along its sides; a nozzle having an arc passageway therein normal to said plane and a flat inner surface on said nozzle surrounding said arc passageway; a plurality of tangential slots formed in said inner surface parallel to said plane; and biasing means acting on said electrode and keeping said front surface pressed against said inner surface.

2. An electrode assembly in accordance with claim 1 in which said slots and grooves are of such size that substantially the entire pressure drop of a plasma forming gas introduced into the body of said torch to flow to the electrode plane occurs across said slots.

3. An electrode assembly in accordance with claim 1 in which said biasing means is a spring permitting axial dimensional changes in said elongated electrode.

4. An electrode assembly in accordance with claim 1 in which said electrode is centered and slidably supported in said body.

5. An electrode assembly in accordance with claim 1 in which said electrode has a reduced diameter portion at its arc terminus end, and in which said distributor is slidably mounted on said portion, whereby biasing pressure on said electrode forces said distributor against the inner surface of said nozzle.

* * * * *